INVENTORS.
Wilbur F. Jackson
& John W. Wright.
BY
Albert J. Henderson
ATTORNEY.

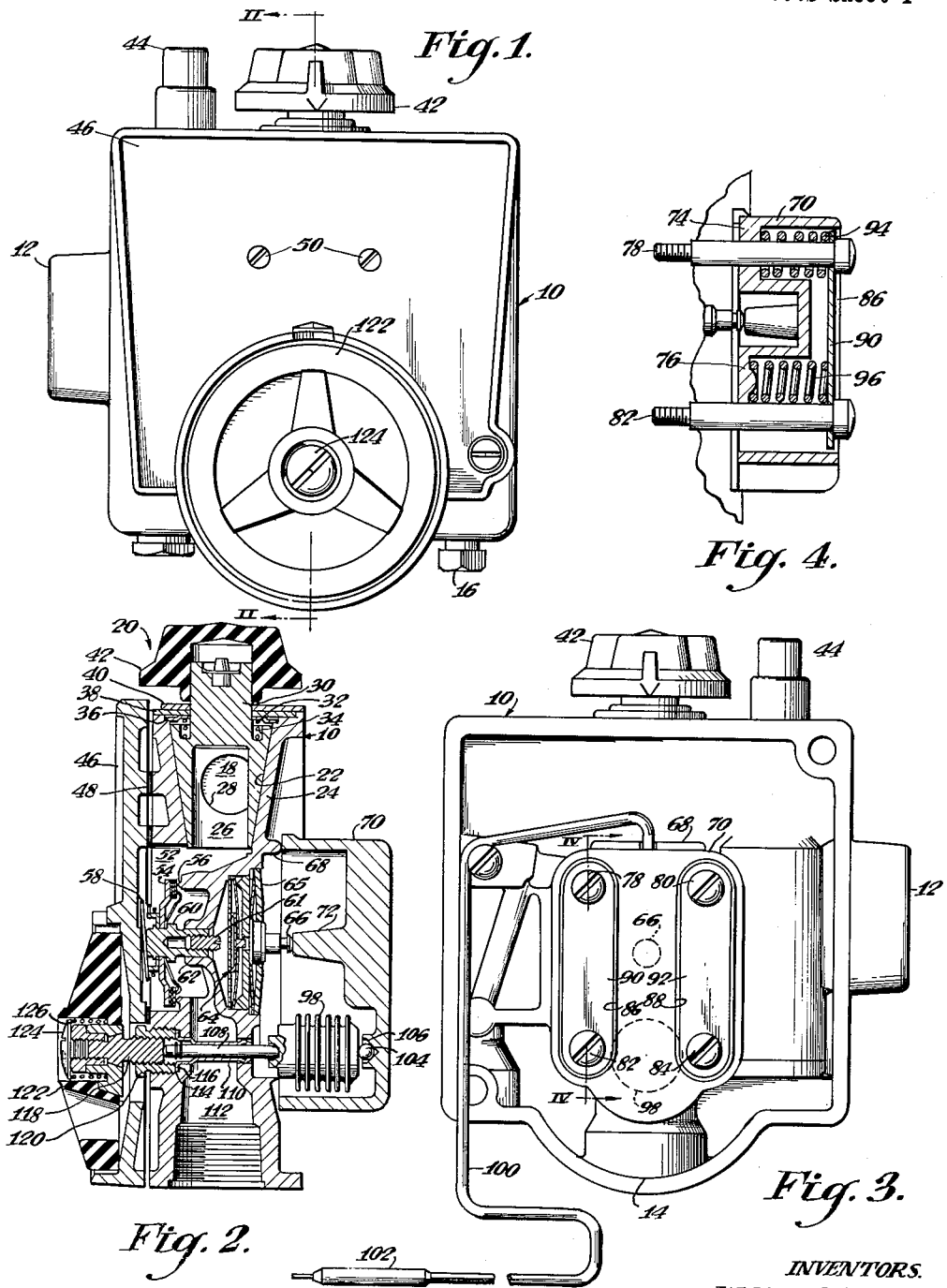

United States Patent Office 2,975,974
Patented Mar. 21, 1961

2,975,974
THERMOSTATIC CONTROL DEVICES

Wilbur F. Jackson, Compton, and John W. Wright, Long Beach, Calif., assignors to Robertshaw-Fulton Controls Company, Richmond, Va., a corporation of Delaware Filed July 1, 1957, Ser. No. 669,286

6 Claims. (Cl. 236—48)

This invention relates to control devices and more particularly to thermostatic control devices for space heating apparatus.

An object of this invention is to utilize a resiliently mounted housing as a levered valve operator for a control device.

Another object of this invention is to effectuate precise valve movement in a control device by fulcruming the valve operating means on the exterior casing of the control device.

It is another object of this invention to so arrange the levered valve operator of a control device that a selected lever force and a thermally responsive lever force act in the same direction.

It is a further object of this invention to mount a levered valve operator on the casing of a control device with resilient means to bias the operator in an actuating direction and with thermally responsive means to move the operator against such bias.

This invention has another object in that a resiliently mounted housing exerts a biasing force on the actuating means of a control device and a control dial and shaft are operable to vary such biasing force a predetermined amount.

In one preferred embodiment of the invention, a thermostatic valve member is mounted within a casing of a control device for controlling a flow of fluid therethrough. The valve member is normally biased to a closed position by a coil spring. A valve stem extends through the casing into engagement with a snap acting mechanism which moves the valve member to an open position against the bias of its coil spring. The operating means for the snap acting mechanism is in the form of a resiliently mounted housing which is fulcrumed on the exterior casing and which has a rib member engaging the snap acting mechanism. A bellows member expands and contracts in response to temperature variations and acts to move the housing as a lever about its fulcrum against the bias of its resilient mounting. Rotation of a temperature selecting dial causes axial movement of the bellows member to position the levered housing in a selected position. Other objects and advantages will become apparent from the following description taken in connection with the accompanying drawings wherein:

Fig. 1 is a front elevation view of a control device embodying this invention;

Fig. 2 is a longitudinal sectional view taken on line 2—2 of Fig. 1;

Fig. 3 is a rear elevation view of the device shown in Fig. 1;

Fig. 4 is a sectional view taken on line 4—4 in Fig. 3;

Figure 5:
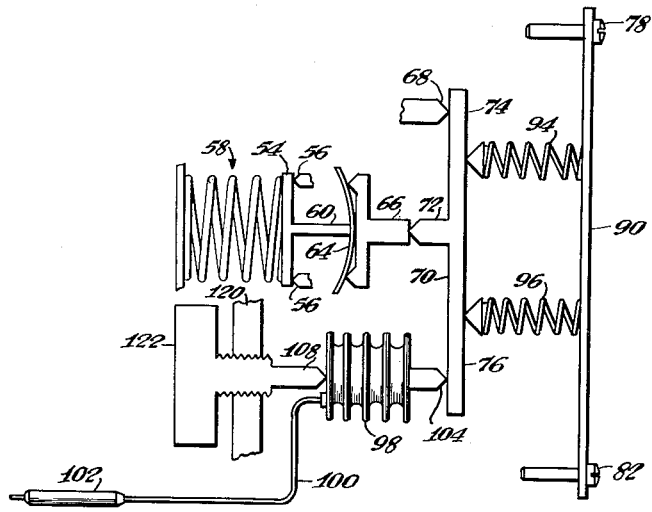
Fig. 5 is a schematic arrangement of a lever system with a valve member being shown in a closed position.

As is illustrated in Figs. 1 and 2, the control device includes a casing, indicated generally at 10, having an inlet port 12, a main outlet port 14 for supplying fuel to a main burner, and a pilot outlet port 16 for supplying fuel to a pilot burner. A fuel passage 18 establishes communication between inlet port 12 and a manually operable shut-off valve, indicated generally at 20. A conical bore 22 is formed in the upper part of casing 10 and seats a corresponding shaped shut-off cock 24 of valve 20. The lower portion of shut-off cock 24 has a cylindrical bore 26 with a circular opening 28 in its wall for alignment with passage 18. The upper portion of shut-off cock 24 is provided with a generally cylindrical end portion 30 which projects exteriorly of the casing 10.

A spring 32 encircles a part of end portion 30 and is mounted in compression between a recess 34 formed in the shut-off cock 24 and a washer 36. The spring 34 and washer 36 are held in place by a cover plate 38 which is fastened to the top of casing 10 by any suitable means (not shown). A ring disc 40 is adjustably mounted on cover plate 38 and is provided with an upturned lug (not shown) which acts as a stop to limit the rotation of a dial 42 which is secured to an end portion 30 by any suitable means.

A thermoelectric safety valve (not shown) is positioned in the passageway 18 between inlet port 12 and shut-off valve 20. A magnet reset button 44 for such a safety valve is shown protruding from the top of casing 10. Thermoelectric safety devices of this type are well known in the art and a detailed drawing and description of the safety valve structure as contained in casing 10 are deemed unnecessary.

The front of casing 10 is provided with a cover plate 46 and gasket 48 which are secured to the casing 10 by any suitable means, such as screws 50.

Cylindrical bore 26 of shut-off cock 24 communicates with a valve chamber 52 in the casing 10. A disc shaped valve member 54 is positioned in chamber 52 and cooperates with an annular valve seat 56 formed in the internal wall of casing 10. Valve member 54 is biased toward valve seat 56 by a coil spring 58 which is mounted in compression between valve 54 and the internal surface of cover plate 46. A valve stem 60 has one end suitably connected to valve member 54 and a free end with an adjustable set screw 61 projecting through a bushing 62 formed in the casing 10 to extend into engagement with actuating means 64. The actuating means is in the form of a snap acting mechanism in which a clicker disc moves from an inoperative to an operative position through an over center position with a snap action in response to an applied operating force. The snap acting mechanism 64 is retained in a recess formed in the rear wall of casing 10 by a retainer and seal assembly 65 and includes an operating button 66 extending rearwardly of casing 10 for a purpose to be described hereinafter.

The rear of casing 10 is provided with a rib 68 which serves as a fulcrum for a levered housing 70. Housing 70 has a generally rectangular cup-shape with a centrally positioned rib member 72 which abuts the thrust button 66 of the snap acting mechanism. As is illustrated in Fig. 4, the inner portion of housing 70 has a pair of apertured cross plates 74 and 76. Assembly screws 78 and 80 extend through apertured plate 74 into standard shank threaded bores (not shown) in the rear of casing 10. Assembly screws 82 and 84 extend through apertured plate 76 and are similarly threaded into casing 10.

The outer portion of housing 70 (Fig. 3) is provided with a pair of slots 86 and 88 in which correspondingly shaped straps 90 and 92, respectively, are loosely received. Straps 90 and 92 are apertured in alignment with the apertures in cross plates 74 and 76 so that the heads of assembly screws 78 and 82 bear against strap 90 and the heads of assembly screws 80 and 84 bear against strap 92. A coil spring 94 encircles the shank of screw 78 and is mounted in compression between housing cross plate 74 and strap 90; another coil spring (not shown) is similarly mounted with screw 80 and strap 92. A pair of coil springs 96 (only one being shown) is mounted in compression between housing cross plate 76 and straps 90 and 92 adjacent screws 82 and 84, respectively.

A temperature responsive means includes a bellows 98, a capillary tube 100 and a thermal sensing bulb 102, which comprise a closed system filled with a thermally expansible fluid so that a variation of temperature sensed by the sensing bulb 102 produces a corresponding expansion or contraction of bellows 98. One end of bellows 98 carries a thrust ball 104 which fits into a socket 106 formed in an interior wall of housing 70. The opposite end of bellows 98 is secured to and supported by one end of a control shaft 108 so that they move axially as a unit.

A sleeve 110 extends through casing 10 across the outlet passage 112 and has one end thereof press fitted and sealed within a hole in casing 10, the other end thereof having a flanged portion 114 abutting a gasket 116 to provide effective sealing from passage 112. Control shaft 108 extends from bellows 98 through sleeve 110 and has its opposite end engaging an adjusting screw 118 which is threaded into a bushing 120. Bushing 120 is threaded into casing 10 and maintains flanged portion 114 in engagement with gasket 116. The adjusting screw 118 has one end projecting through cover plate 46 to which a manually rotatable dial 122 is attached by any suitable means such as screw 124 and coil spring 126. It will be apparent to those skilled in the art that rotation of adjusting screw 118 relative to casing 10 by dial 122 will effect axial movement of adjusting screw 118 through a range of temperature settings (not shown) appropriately indicated on the dial 122.

This thermostatic control device has had a successful application in a cold air return system wherein it is located at base of a wall heater and reacts to temperature variations occurring at the floor level, and to the air returning to the bottom of the heater for recirculation. Inasmuch as the air movement across the floor and into the heater base is the most active and rapidly moving air in the room, the thermostatic element responds to changing temperatures with unusual speed to provide room comfort control with surprisingly little variation.

To place the control device in operation, the dial 42 is rotated to a "Pilot" position so that reset button 44 may be depressed and the pilot burner ignited in a manner well known in the art. Dial 42 is then rotated to an "On" position and the temperature setting dial 122 is rotated to a desired temperature setting so that a flow of fuel through the thermostatic valve chamber supplies the main burner with the amount of fuel required to heat a room or space.

Assuming that the space has been heated to the desired degree, the operating elements of the control device will be in their positions shown schematically in Fig. 5. Bellows 98 has been expanded causing levered housing 70 to compress coil springs 94 and 96 and the other two coil springs (not shown) against the strap retainers 90 and 92 which are held stable by the heads of assembly screws 78—82 and 80—84, respectively. Counterclockwise movement of levered housing 70 about fulcrum 68 as viewed in Fig. 5 decreases the operating force on thrust button 66 so that the snap acting mechanism 64 is in its inoperative position permitting coil spring 58 to bias valve member 54 to a closed position. Thus the position of valve member 54 is dependent upon the resultant of the bellows force and the resilient mounting force.

Figure 6:
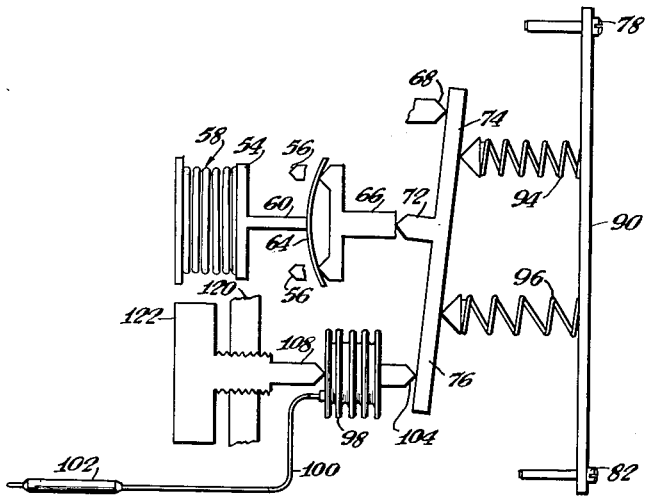
Fig. 6 is a similar schematic arrangement of the lever system with the valve member shown in an open position.

As the space is cooled, the sensing bulb 102 positioned in the cold air return path senses the decrease in temperature which is reflected in the contraction of bellows 98. The resulting decrease in the bellows force on levered housing 70 permits its resilient mounting to move the same clockwise about fulcrum 68 so that an operating force is gradually applied by housing rib 72 on thrust button 66. When the operating force reaches a predetermined value, the snap acting mechanism 64 is actuated to move valve member 54 to an open position against the bias of coil spring 58. The relative positions of the operating elements of the control device are schematically shown in Fig. 6 with valve member 54 in an open position. The flow of fuel is again restored to the main burner resulting in a rise in temperature of the space. This continuing cycle regulates the temperature of the space until the control device is manually shut off or until the thermoelectric safety valve is automatically closed.

The biasing force exerted by the resilient mounting springs must be sufficient to overcome the snap acting mechanism but not great enough to overstress the bellows 98. With bellows 98 depressing the mounting springs, this control device permits excessively high ambient temperatures to be endured without harm to the bellows because of the built-in long override. It is apparent that rotation of temperature dial 122 causes bellows 98 to move levered housing 70 in an arc about fulcrum 68; expansion or contraction of bellows 98 also moves levered housing 70 in a similar manner and direction.

Only one embodiment of the invention has been presented herein and inasmuch as such invention is subject to many variations, modifications and reversal of parts, it is intended that all matter contained in the above description of this embodiment shall be interpreted as illustrative and not in a limiting sense.

We claim:

1. In a control device, the combination comprising a casing, flow control means enclosed within said casing being movable between controlling positions, means to bias said flow control means to one of its positions, actuating means to move said flow control means against said biasing means to another of its positions, said actuating means having a portion extending exteriorly of said casing, a hollow levered housing exteriorly of said casing engaging said actuating means and being fulcrumed on said casing, said portion of said actuating means extending within the hollow portion of said levered housing, spring means biasing said levered housing in an arc toward said casing to exert a force on said actuating means to move said flow control means to the said another of its positions, and thermally responsive means operatively engaging said levered housing and exerting a second force thereon opposite to the first force and variable in accordance with temperature variations so that operation of said actuating means is dependent upon the resultant of the forces, said thermally responsive means extending within the hollow portion of said levered housing.

2. In a control device, the combination comprising a casing having a plurality of ports separated by a valve chamber, an annular valve seat fixed in the chamber, a movable valve member cooperating with said valve seat to control a flow of fuel through the chamber, resilient means biased between a wall of the chamber and said valve member to bias the same to a closed position, a valve stem having one end affixed to said valve member and a free end protruding through said annular valve seat and exteriorly of said casing, a snap-acting actuator disposed adjacent the free end of said valve stem and being movable into engagement with the free end of said valve stem to cause movement of said valve member to an open position against the bias of said resilient means, a fulcrum on the exterior of said casing, a levered housing having one end engaging said fulcrum and a rib member engaging said snap-acting actuator, fastening means extending through said housing into said casing, a plurality of spring retainers engaging said fastening means, a plurality of coil springs disposed in said housing between a wall thereof and said spring retainers to mount said housing yieldably on said casing whereby its rib member biases said snap-acting actuator, a movable bellows engaging said housing for moving the same against the bias of said coil springs, a thermal element connected to said bellows whereby the expansion and contraction thereof is dependent upon the temperature of said thermal element, and a control shaft operatively connected to said bellows for moving the bellows and housing to a selected position.

3. In a control device, a casing having an actuator thereon movable to a plurality of positions for controlling a condition in said casing, a hollow member pivotally mounted exteriorly of said casing having a portion thereof engaging said actuator, fastening means extending through said hollow member and into said casing, a plurality of spring retainers engaging said fastening means, a plurality of coil springs compressed between said member and said spring retainers to mount said member yieldably on said casing whereby said portion of said member moves said actuator to one of said positions, and means engageable with said member to move said actuator to another of said positions, said hollow member being constructed to enclose said actuator and said last-named means.

4. In a control device for supplying a flow of fuel to a burner of a space heater or the like, the combination comprising a casing, flow control means in said casing being movable between controlling positions and having a member protruding exteriorly of said casing, resilient means in said casing for biasing said flow control means to one of its positions, actuating means exterior of said casing being engageable with the protruding member for moving said flow control means to another position, a fulcrum exteriorly located on said casing, a cup-shaped housing substantially enclosing said actuating means having a first portion engaging said fulcrum and a second portion engaging said actuating means, a resilient mounting yieldably securing said housing to said casing with its first portion biased against said fulcrum and with its second portion exerting a biasing force on said actuating means to cause the same to position said flow control means in its said another position against the bias of said resilient means, and thermally responsive means having an expansible and contractible element substantially enclosed by said cup-shaped housing and operatively engaging an interior wall portion of said housing to vary the biasing force exerted on said actuating means.

5. In a control device as recited in claim 4 wherein a control rod is axially movable into engagement with the expansible and contractible element for moving the same, and a selecting dial is positioned exteriorly of said casing and is operably connected to said control rod for axially moving the same whereby the expansible and contractible element is positioned against said levered housing to vary the biasing force exerted on said actuating means a predetermined amount.

6. A control device comprising a casing having inlet and outlet openings for fluid, a valve seat in said casing between said openings, a valve member reciprocable on one side of said seat between open and closed positions and biased to said closed position, actuating means including an operator element disposed exteriorly of said casing and being positioned on the opposite side of said seat and operable for overcoming said bias and causing movement of said valve member to said open position, an expansible and contractible member positioned exteriorly of said casing for movement on an axis substantially parallel with said valve member, adjusting means extending through said casing from said one side for supporting said expansible and contractible member in said position, a housing substantially enclosing said operator element and said expansible and contractible member and having a wall portion adapted for abutting relation with said operator element and with said expansible and contractible element, pivotal mounting means between said housing and said casing, and yieldable means establishing said abutting relation and biasing said housing against said pivotal mounting means whereby pivotal movement of said housing upon movement of said expansible and contractible member causes movement of said operator element.

References Cited in the file of this patent

UNITED STATES PATENTS

| | | |
|---|---|---|
| 1,253,593 | Harris et al. | Jan. 15, 1918 |
| 1,661,346 | Sawyer | Mar. 6, 1928 |
| 1,802,349 | MacKay | Apr. 28, 1931 |
| 1,908,765 | Kay | May 16, 1933 |
| 2,069,863 | Taylor | Feb. 9, 1937 |
| 2,614,754 | Caparone | Oct. 21, 1952 |
| 2,797,872 | Eskin | July 2, 1957 |